(12) United States Patent
Van Schaack et al.

(10) Patent No.: US 8,284,951 B2
(45) Date of Patent: Oct. 9, 2012

(54) ENHANCED AUDIO RECORDING FOR SMART PEN COMPUTING SYSTEMS

(75) Inventors: Andy Van Schaack, Nashville, TN (US); Frank Canova, Fremont, CA (US)

(73) Assignee: LiveScribe, Inc., Oakland, CA (US)

( * ) Notice: Subject to any disclaimer, the term of this patent is extended or adjusted under 35 U.S.C. 154(b) by 1168 days.

(21) Appl. No.: 12/129,575

(22) Filed: May 29, 2008

(65) Prior Publication Data

US 2009/0022332 A1 Jan. 22, 2009

Related U.S. Application Data

(60) Provisional application No. 60/940,661, filed on May 29, 2007.

(51) Int. Cl.
*H04R 1/02* (2006.01)
*G06F 3/033* (2006.01)

(52) U.S. Cl. .............................. 381/91; 381/26; 381/334

(58) Field of Classification Search .................. 381/26, 381/91, 334; 345/179
See application file for complete search history.

(56) References Cited

U.S. PATENT DOCUMENTS

| | | | |
|---|---|---|---|
| 5,894,306 A * | 4/1999 | Ichimura | 345/418 |
| 7,175,095 B2 | 2/2007 | Pettersson et al. | |
| 7,281,664 B1 | 10/2007 | Thaeler et al. | |
| 2004/0229195 A1 | 11/2004 | Marggraff et al. | |
| 2004/0260470 A1 | 12/2004 | Rast | |
| 2005/0110778 A1 | 5/2005 | Ayed | |
| 2005/0195988 A1 * | 9/2005 | Tashev et al. | 381/92 |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 | 4/2006 | Marggraff et al. | |
| 2006/0080609 A1 | 4/2006 | Marggraff et al. | |
| 2006/0125805 A1 | 6/2006 | Marggraff et al. | |
| 2006/0127872 A1 | 6/2006 | Marggraff et al. | |
| 2006/0252470 A1 | 11/2006 | Seshadri et al. | |
| 2006/0292543 A1 | 12/2006 | Marggraff et al. | |
| 2007/0097100 A1 | 5/2007 | Marggraff et al. | |
| 2007/0280627 A1 | 12/2007 | Marggraff et al. | |

FOREIGN PATENT DOCUMENTS

WO WO 2007/141204 A1 12/2007

OTHER PUBLICATIONS

PCT International Search Report and Written Opinion, PCT/US08/65153, Sep. 2, 2008, 9 pages.

* cited by examiner

*Primary Examiner* — Ramon Barrera
(74) *Attorney, Agent, or Firm* — Fenwick & West LLP

(57) ABSTRACT

In a pen-based computing system, a pair of microphones captures audio concurrently with a smart pen device capturing handwriting gestures. The audio captured by the pair of microphones is processed to produce an enhanced audio recording. Noise cancellation techniques may be applied to reduce noise generated by the smart pen device interacting with the writing surface to produce a higher quality audio recording. In addition, beam steering techniques may be applied to adjust the gain of portions of the audio signal from different directions and allow the user to focus between multiple audio sources.

24 Claims, 5 Drawing Sheets

ENHANCED AUDIO RECORDING FOR SMART PEN COMPUTING SYSTEMS

CROSS REFERENCE TO RELATED APPLICATIONS

This application claims the benefit of U.S. Provisional Application No. 60/940,661, filed May 29, 2007, which is incorporated by reference in its entirety.

BACKGROUND

This invention relates generally to pen-based computing systems, and more particularly to recording audio in a pen-based computing system.

When trying to absorb a large amount of information delivered orally and possibly visually, such as in a business meeting or classroom setting, people commonly use a pen to take notes on paper. However, once disembodied from the oral presentation in which they were taken, even good notes lose much of their meaning because the context for the notes has been lost. For this reason, people often record a presentation as well as take notes. Since people commonly use a pen to take the notes, it is convenient to incorporate a microphone into the pen. In smart pen computing system, for example, a microphone may be embedded into the smart pen to record audio data while the user takes notes.

However, conventional recording devices have several significant drawbacks. First, use of the smart pen will generate noise very close to a microphone that is embedded in the pen. Handwriting and tapping the pen are common types of input gestures for a smart pen. Handwriting creates noise as the smart pen travels across the paper. This is the case even if the smart pen is not leaving ink—for example, a non-marking stylus traveling across a touch screen. Tapping the pen obviously creates noise as the pen tip impacts the writing surface. With a microphone located in the pen itself, these types of noise can be significant during audio recording since they are so close to the microphone.

In addition, mobile audio recording devices typically use a single microphone that has not been tuned to the physical environments where the recording takes place. Additionally, these microphones typically are used to record a single audio source (e.g., classroom lecturer) but often in a setting where there may be multiple other audio sources (e.g., fellow classmates in the lecture). Small audio recording devices, such as those embedded into a pen, typically lack acceptable far field recording capabilities. In addition, recording devices with a single microphone, or with conventional configurations of two microphones intended for stereo recordings, capture audio without differentiation, or with very little differentiation, as to the directional source of the audio. When two or more speakers or sound sources are recorded that are perceived by the listener as being similar in nature, the listener is often unable to differentiate between the speakers or sound sources. As a result, in an environment where there are multiple sources of audio (e.g., a meeting room with several people, or a classroom where the lecturer and fellow classmates are speaking simultaneously) or where the desired source is at some distance from the recording device, it can be difficult to identify the desired source when the recorded audio is replayed.

Accordingly, new approaches to recording audio are needed to fill the needs unmet by existing methods.

SUMMARY

A pen-based computing system records and processes audio to provide enhanced audio recording. Audio is recorded by a first and second microphone, each located at different positions within the pen-based computing system. In one embodiment, each microphone is located at a different position on the surface of a smart pen device. Alternatively, microphones are located on ear bud devices worn by a user and are communicatively coupled to the smart pen device via an electronic interface. In one embodiment, handwriting gestures are captured by the smart pen device concurrently with capturing the audio. The processed audio and handwriting gestures captured concurrently with the audio are then synchronized in time such that notes related to the record audio can be retrieved as the audio is being played back.

The audio recorded by the two microphones may be processed according to a variety of processing functions in order to enhance the audio recording. In one embodiment, noise cancellation processing is applied to reduce noise generated from the interaction between the smart pen device and the writing surface. In another embodiment, beam steering techniques are applied to allow a user to adjust the gain between audio originating from different directions. Audio may be processed in real-time by a processor on the smart pen device, or may be transferred to an external computing system for processing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
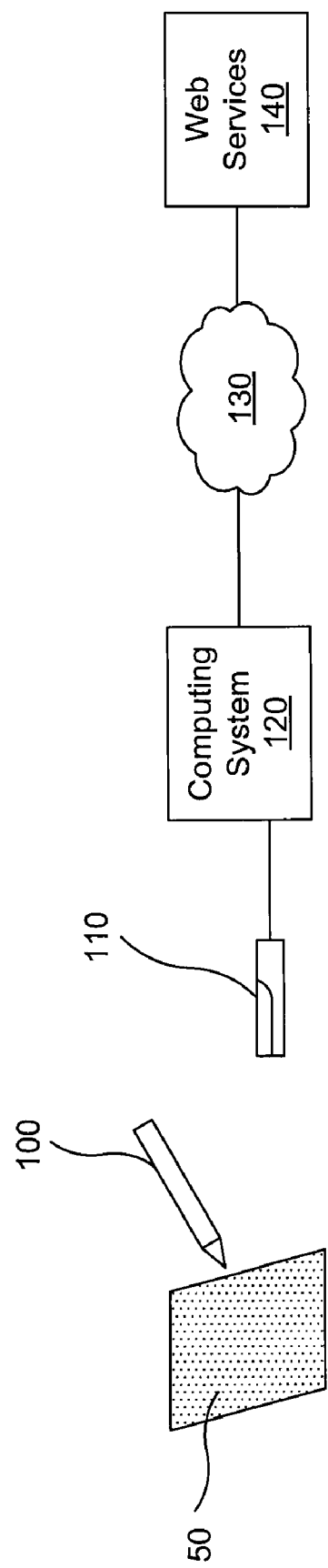
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
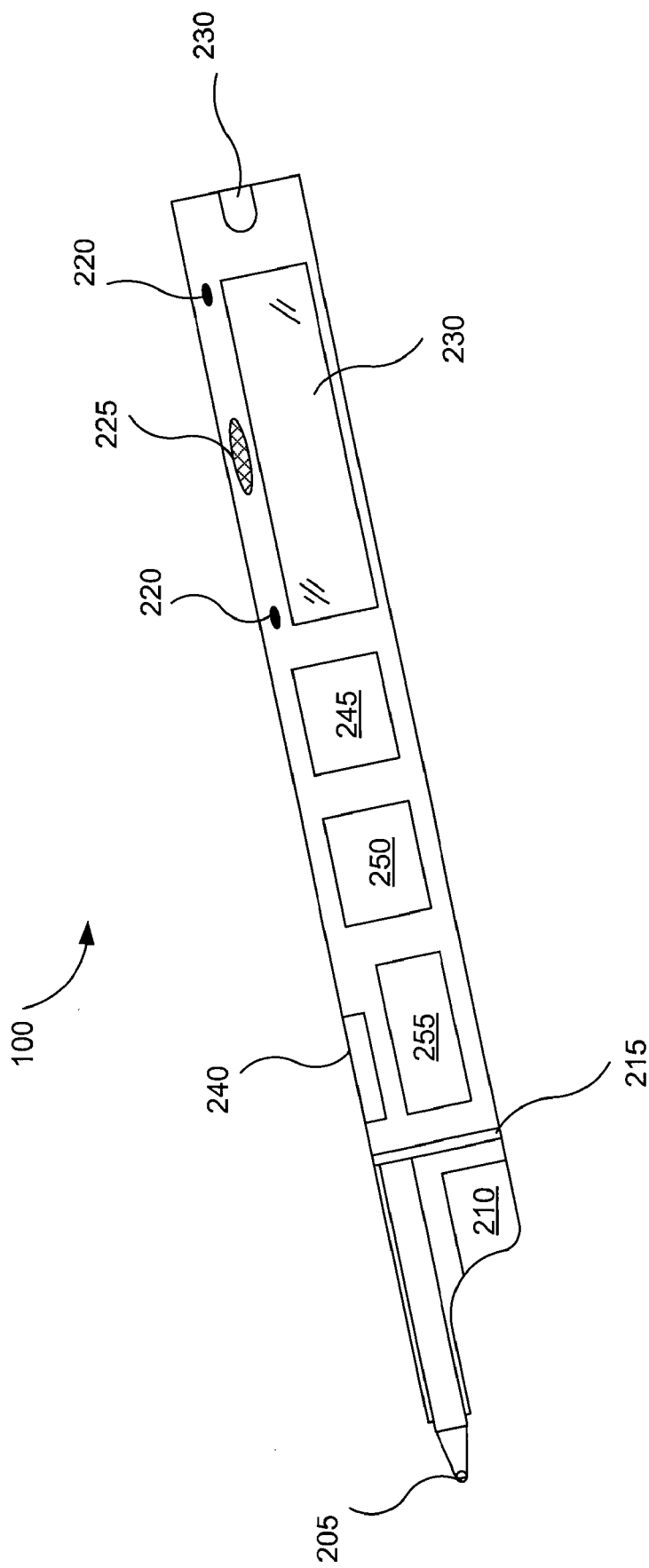
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user. The use of microphones 220 for recording audio in the smart pen 100 is discussed in more detail below.

Figure 3:
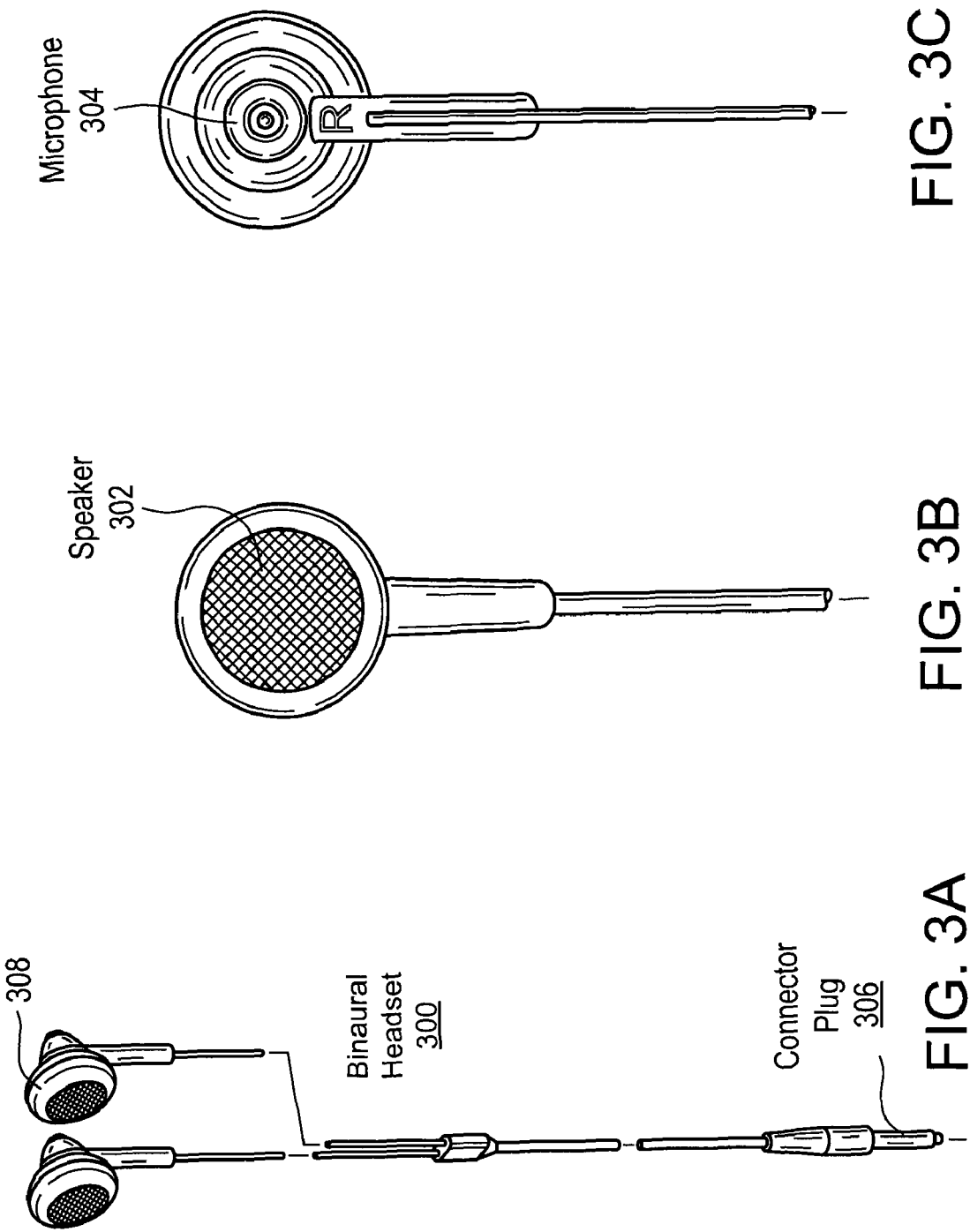
FIG. 3A illustrates a binaural headset for audio recording, in accordance with an embodiment of the invention.
FIG. 3B illustrates a front view of a binaural headset for audio recording, in accordance with an embodiment of the invention.
FIG. 3C illustrates a back view of a binaural headset for audio recording, in accordance with an embodiment of the invention.
Figure 4:
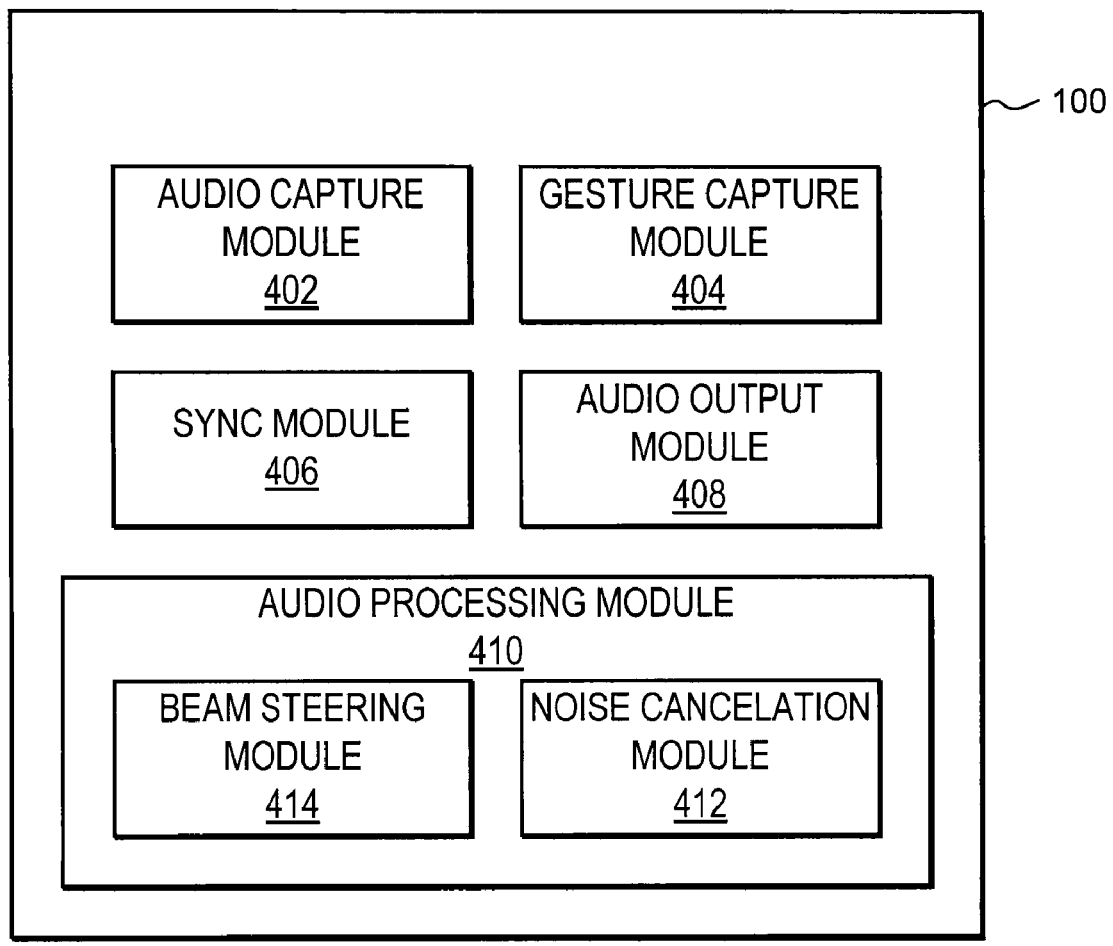
FIG. 4 illustrates an embodiment of a memory for capturing and processing audio in a smart pen computing system in accordance with an embodiment of the invention.

In an alternative embodiment, one or more microphones may be external to the smart pen 100 and communicate captured audio data to the smart pen 100 via the audio jack 230 or via a wireless interface. An example embodiment of an external microphone system for use with the smart pen 100 is described in more detail below with reference to FIG. 3.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. The audio jack 230 may also be used as an input from external microphones. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech. Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

External Microphone System

One embodiment of an external microphone system for audio recording uses a binaural headset 300 as illustrated from multiple viewpoints in FIG. 3A-3C. In one embodiment, the headset 300 is designed to plug into the audio jack 230 on the smart pen 100 described above using the connector plug 306. Alternatively, the headset 300 may include a wireless interface to communicate with the smart pen 100 (e.g., a bluetooth interface). In the embodiment of FIGS. 3A-3C, the headset 300 is an "earbud"-style headset. Each pair in the headset 300 includes an earbud-style speaker (earphone) 302 and a microphone (earmic) 304 built into the opposite side of the earbud body 308. When worn, the earphone speakers 302 are located in-ear. Note that the earphones speakers 302 and earmics 304 are optimally located at approximately the same location near the entrance to the ear canal but facing opposite directions. This results in a more accurate recording and playback of binaural audio, since the device is not recording audio received at one location and then playing it back from a different location and/or recording audio received from one direction and then playing it back in a different direction.

Enhanced Audio Recording

In one aspect of the invention, embodiments present a way to record audio by incorporating two or more microphones in the smart pen computing system. The microphones may be in different positions and/or orientations in the pen 100, or positioned externally to the pen 100 and communicatively coupled to the pen 100 via the audio jack 230. Using multiple microphones enables the reduction of noise (transported through the air or through mechanical vibrations) through phase cancellation, for example. In a smart pen computing system where the pen 100 itself has sufficient processing power, the noise cancellation may be executed by a processor on the smart pen itself, possibly in real-time, as opposed to capturing and storing separate audio channels for each microphone for subsequent off-pen noise cancellation.

Furthermore, real-time or post-processing of the audio, either on-pen or off-pen, can be performed to further enhance the audio signal. Through audio beam steering techniques, signals from two (or more) microphones 220 are analyzed. Audio signals that differ in arrival times by great than or less than a predetermined interval can be enhanced or minimized. Accordingly, as an example, a user using the binaural headset 300 of FIG. 3 may choose to enhance only those audio sources that fall within a 45 degree angle directly in front of them. Audio perceivability can be boosted by as much as 25 dB through beam steering.

In one embodiment, the smart pen device 100 includes various modules for enhancing the audio captured by two or more microphones. Each module comprises computer program logic and/or data for providing the specified functionality. A module can be implemented in hardware, firmware, and/or as computer executable program instructions executable by a processor. In one embodiment, the smart pen device 100 includes an audio capture module 402, a gesture capture module 404, a synchronization module 406, an audio output module 408, and an audio processing module 410. The audio capture module 402 captures audio using two or more microphones. The gesture capture module 404 captures handwriting gestures concurrently with capturing audio. The audio processing module 410 processes the captured audio and a synchronization module 406 synchronizes the audio with the handwriting gestures captured concurrently with the audio. In one embodiment, the audio processing module includes a noise cancellation module 412 and a beam steering module 414 as will be described in more detail below. The smart pen device 100 also includes an audio output module 408 for playing back recorded and processed audio. In alternative embodiments, various modules may execute on an external computing system 120 rather than on the smart pen device 100.

Figure 5:
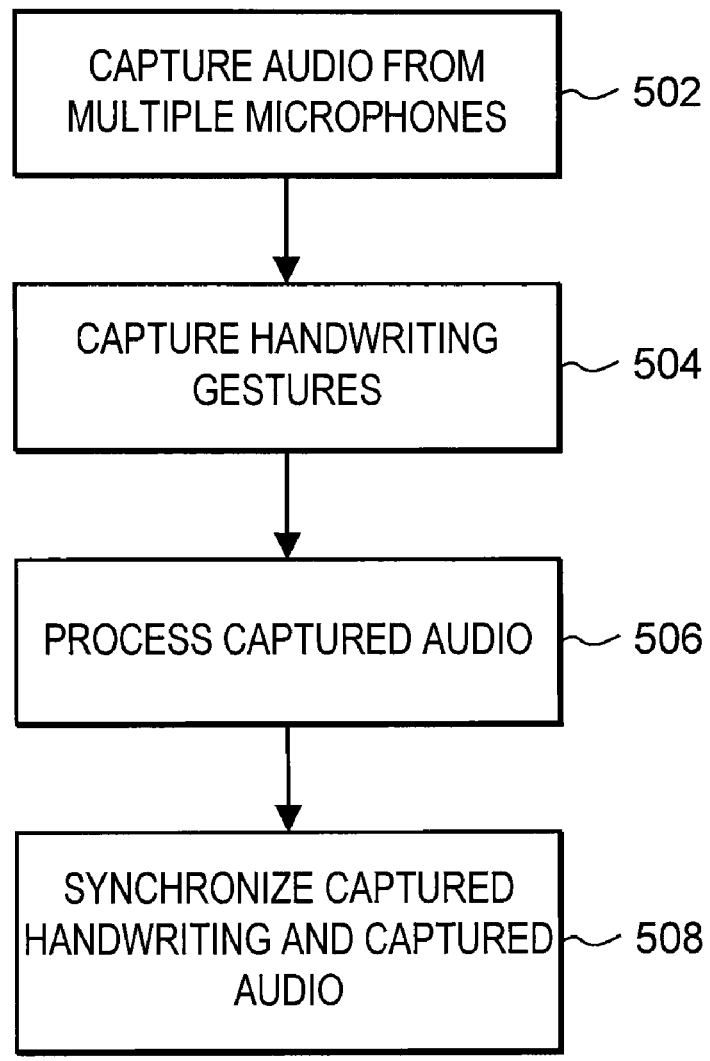
FIG. 5 illustrates an embodiment of a process for capturing and processing audio in a smart pen computing system in accordance with an embodiment of the invention.

FIG. 5 illustrates a process for recording and enhancing audio in a smart pen computing system. The smart pen device captures 502 audio using two or more microphones and captures 504 handwriting gestures as a user writes on a writing surface. Although illustrated as separate steps in the process, it should be understood that capturing 502 audio and capturing 504 handwriting gestures may occur concurrently. In this manner, the smart pen device can capture, for example, a presentation as a user takes notes related to the audio captured from the speaker. The smart pen computing system then processes 506 the audio to enhance the recording according to a variety of different functions. For example, the smart pen computing system may apply noise cancellation or beam steering techniques to improve the recorded audio. The smart pen computing system then synchronizes the captured audio and gestures in time. Thus, a user can later replay a captured presentation or other audio events and retrieve notes synchronized with the captured audio. In various embodiments, the step of processing the audio 506 can be performed by an audio processing module within the smart pen device 100 or unprocessed audio can be transferred to the external computing system 120 for post processing. Various embodiments, alternatives and other features of the foregoing are described in more detail below.

Noise Cancellation

As illustrated in FIG. 2, an embodiment of the smart pen includes a display 235 (e.g., an OLED matrix display) located in the back half of the barrel of the device. In one implementation, the smart pen 100 also includes two microphones 220, one located on each side of the display 235 (i.e., one "in front of" the display 235 towards the tip of the smart pen 100 and the other "behind" the display 235 towards the butt of the smart pen 100). In this example, standard noise cancellation techniques are executed on-pen (e.g., by a processor and audio processing algorithm) to significantly reduce pen noise generated by handwriting and/or pen taps.

In alternate embodiments, different numbers of microphones 220 and/or placement of the microphones 220 can be used. In addition, the noise cancellation can be implemented off-pen, on-pen, or a combination of the two. It can also be implemented in real-time, or not.

This technique is also not limited to smart pens or to smart pen computing systems. Any pen (or other writing instrument) that is intended to record audio while writing or interacting with a surface using a stylus will encounter pen noise. Noise cancellation can be used to significantly reduce the pen noise and increase the quality of the audio recording.

Audio Beam Steering

Audio beam steering techniques can be used to further enhance selectivity. In audio beam steering, the relative phase of audio signals recorded at different locations (e.g., at the right ear and at the left ear using an external microphone system) is adjusted to increase the gain for certain directions and/or reduce the gain in other directions. For example, if a student is sitting on the right hand side of a lecture hall, the lecturer will be in front of him and to his left. The gain in this direction can be boosted by using audio beam steering techniques. Conversely, if an unusually loud classmate is several rows in front and to the right, the gain in this direction can be reduced. The gain adjustment can be used during record and/or during playback. Thus, the same multi-channel audio recording can be played back with different beam steering patterns to boost or reduce different sources. For example, referring again to the classroom scenario described above, the user could play back the recording a first time to focus on the lecturer that is in front of the user and to the left. The user could then play back the recording a second time to focus on the student sitting to the right. In addition, audio enhancement processing can be executed on multiple audio sources in a single-step or multi-step process to enhance audio originating from two different speakers in a noisy environment. For example, in a first pass, all sounds other than those originating from the first speaker are selectively reduced or eliminated using beam steering and noise cancellation techniques. In a second pass, all sounds other than those originating from the second speaker are selectively reduced or eliminated. Finally, the two audio tracks are overlayed on each other to produce a final, enhanced audio track.

In another embodiment, a dynamic beam-steering technique is used to track a particular speaker or sound source based upon the source's unique audio characteristics. For example, rather than enhancing audio originating from a fixed direction, the smart pen computing system can instead enhance a particular speaker's voice or audio source independently of its location. In this embodiment, the location of a selected audio source (e.g., a speaker's voice) is automatically identified and the beam is steered to dynamically track that audio source as the location of the audio source changes.

In one embodiment, captured audio is post-processed in order to maintain the perceived spatial position of all sound sources irrespective of head movements during recording. For example, if a listener/recorder wearing binaural microphones records a meeting without rotating his/her head, then all recorded audio sources will be aurally perceived as being the same spatial location on playback as on recording. However, it may often be the case that the positions of the microphones change during recording. For example, if a user records using a binaural headset, the user's head may rotate during recording as the user turns to look at different speakers. Then, during playback, the spatial locations of the speakers will appear to rotate about the listener's head as though the room itself was rotating. Through post-processing of audio, this sense of rotation can be reduced or minimized to accurately reproduce the original recording.

Audio perceivability can be boosted by as much as 25 dB through beam steering. In one implementation, multi-channel audio recording is created by binaural recording using, for example, the binaural microphones described with reference to FIG. 3. Alternatively, beam steering can also be used with other types of multi-channel audio recording as will be known to those of ordinary skill in the art.

Additional Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for recording audio in a smart pen computing system, the method comprising:
   capturing audio using a first microphone and a second microphone, the first and second microphones located at different positions in the smart pen computing system;
   capturing handwriting gestures by a smart pen device of the smart pen computing system concurrently with capturing the audio;
   processing the audio captured by the first and second microphones, wherein processing the audio comprises canceling noise generated from interaction between the smart pen device and a writing surface; and
   synchronizing the processed audio with the handwriting gestures captured concurrently with the audio.

2. The method of claim 1, further comprising:
   transferring the captured audio to an external computing system; and
   processing the audio on the external computing system.

3. A method for recording audio in a smart pen computing system, the method comprising:
   capturing audio using a first microphone and a second microphone, the first and second microphones located at different positions in the smart pen computing system;
   capturing handwriting gestures by a smart pen device of the smart pen computing system concurrently with capturing the audio;
   processing the audio captured by the first and second microphones, wherein processing the audio comprises:
      detecting movement of the first and second microphone during the capturing of the audio; and
      processing the audio to reduce aurally perceivable distortion caused by the movement; and
   synchronizing the processed audio with the handwriting gestures captured concurrently with the audio.

4. A method for recording audio in a smart pen computing system, the method comprising:
   capturing audio using a first microphone and a second microphone, the first and second microphones located at different positions in the smart pen computing system;
   capturing handwriting gestures by a smart pen device of the smart pen computing system concurrently with capturing the audio;
   processing the audio captured by the first and second microphones, wherein the audio is processed on the smart pen device; and
   synchronizing the processed audio with the handwriting gestures captured concurrently with the audio.

5. The method of claim 4, wherein processing the audio comprises beam steering to adjust a gain of a first portion of the audio received from a first direction relative to a second portion of the audio received from a second direction.

6. The method of claim 4, wherein processing the audio comprises:
   processing first audio originating from a first audio source to obtain a first audio channel;
   processing second audio originating from a second audio source to obtain a second audio channel;
   combining the first audio channel and the second audio channel to obtain an enhanced stereo channel.

7. The method of claim 4, wherein processing the audio comprises:
   identifying an audio source based on characteristics of the captured audio;
   determining a direction of the identified audio source, wherein the determined direction is updated as the audio source changes location; and
   applying beam steering to the captured audio to adjust a gain of a first portion of the audio received from the direction of the identified audio source relative to a second portion of the audio.

8. The method of claim 4, wherein the first microphone is located near a left ear of a user operating the smart pen device, and the second microphone is located near a right ear of the user.

9. The method of claim 4, wherein the first microphone is located at a first position on a surface of the smart pen device and the second microphone is located at a second position on the surface of a smart pen device at a distance from the first position.

10. The method of claim 4, wherein processing the audio comprises processing the audio in real-time.

11. The method of claim 4, further comprising outputting the processed audio to a speaker.

12. A computer program product for recording audio in a smart pen computing system, the computer program product comprising a non-transitory computer-readable storage medium containing computer program code that comprises:
   an audio capture module for capturing audio using a first microphone and a second microphone, the first and second microphones located at different positions in the smart pen computing system;
   a gesture capture module for capturing handwriting gestures, the handwriting gestures captured concurrently with capturing the audio;
   an audio processing module for processing the audio captured by the first and second microphones, wherein the audio processing module comprises a noise cancellation module to cancel noise generated from interaction between the smart pen device and a writing surface; and a synchronization module for synchronizing the processed audio with the handwriting gestures captured concurrently with the audio.

13. A computer program product for recording audio in a smart pen computing system, the computer program product comprising a non-transitory computer-readable storage medium containing computer program code that comprises:
an audio capture module for capturing audio using a first microphone and a second microphone, the first and second microphones located at different positions in the smart pen computing system;
a gesture capture module for capturing handwriting gestures, the handwriting gestures captured concurrently with capturing the audio;
an audio processing module for detecting movement of the first and second microphone during the capturing of the audio and processing the audio captured by the first and second microphone to reduce aurally perceivable distortion caused by the movement; and
a synchronization module for synchronizing the processed audio with the handwriting gestures captured concurrently with the audio.

14. A pen-based computing system for recording audio, the system comprising:
a gesture capture system on a smart pen device for capturing handwriting gestures of a user interacting with a writing surface;
a first microphone located at a first position on a surface of the smart pen device, the first microphone communicatively coupled to the smart pen device for recording audio concurrently with capturing the handwriting gestures; and
a second microphone located at a second position on the surface of the smart pen device at a distance from the first position, the second microphone communicatively coupled to the smart pen device for recording the audio concurrently with capturing the handwriting gestures;
a processor programmed to process the audio captured by the first and second microphones and to synchronize the processed audio with the handwriting gestures captured concurrently with the audio;
a memory for storing the processed audio and the handwriting gestures; and
an interface for transferring the processed audio and the captured handwriting gestures to an external computing system.

15. The system of claim 14, wherein the processor processes the audio to cancel noise in the recorded audio generated from interaction between the smart pen device and the writing surface.

16. The system of claim 14, wherein the processor applies a beam steering function to the audio, the beam steering function adapted to adjust a gain of a first portion of the audio received from a first direction relative to a second portion of the audio received from a second direction.

17. A pen-based computing system for recording audio, the system comprising:
a gesture capture system on a smart pen device for capturing handwriting gestures of a user interacting with a writing surface;
a first microphone placed at a first position and communicatively coupled to the smart pen device for recording audio concurrently with capturing the handwriting gestures;
a left ear bud housing the first microphone and adapted to be worn on a left ear;
a second microphone placed at a second position and communicatively coupled to the smart pen device for recording the audio concurrently with capturing the handwriting gestures;
a right ear bud housing the second microphone and adapted to be worn on a right ear;
an ear bud interface for communicatively coupling the left ear bud and the right ear bud to the smart pen device;
a processor programmed to process the audio captured by the first and second microphones and to synchronize the processed audio with the handwriting gestures captured concurrently with the audio;
a memory for storing the processed audio and the handwriting gestures; and
an interface for transferring the processed audio and the captured handwriting gestures to an external computing system.

18. The system of claim 17, further comprising:
a left speaker housed in the left ear bud and adapted to play back a first portion of the recorded audio; and
a right speaker housed in the right ear bud and adapted to play back a second portion of the recorded audio.

19. A computer program product for recording audio in a smart pen computing system, the computer program product comprising a non-transitory computer-readable storage medium containing computer program code that comprises:
an audio capture module for capturing audio using a first microphone and a second microphone, the first and second microphones located at different positions in the smart pen computing system;
a gesture capture module for capturing handwriting gestures using a smart pen device, the handwriting gestures captured concurrently with capturing the audio;
an audio processing module for processing the audio captured by the first and second microphones, wherein the audio processing module is stored on the smart pen device and causes a processor on the smart pen device to process the audio on the smart pen device;
a synchronization module for synchronizing the processed audio with the handwriting gestures captured concurrently with the audio.

20. The computer program product of claim 19, wherein the audio processing module further comprises a beam steering module to adjust a gain of a first portion of the audio received from a first direction relative to a second portion of the audio received from a second direction.

21. The computer program product of claim 19, wherein the audio processing module further executes steps including:
processing first audio originating from a first audio source to obtain a first audio channel;
processing second audio originating from a second audio source to obtain a second audio channel;
combining the first audio channel and the second audio channel to obtain an enhanced stereo channel.

22. The computer program product of claim 19, wherein the audio processing module further executes steps including:
identifying an audio source based on characteristics of the captured audio;
determining a direction of the identified audio source, wherein the determined direction is updated as the audio source moves; and
applying beam steering to the captured audio to adjust a gain of a first portion of the audio received from the direction of the identified audio source relative to a second portion of the audio.

23. The computer program product of claim 19, wherein the audio processing module processes the audio comprises processing the audio in real-time.

24. The computer program product of claim 19, further comprising an audio output module for outputting the processed audio to a speaker.

* * * * *